FIG. 2.

INVENTOR.
ROBERT E. HINELINE
BY Nicholas T. Volk
ATTORNEY.

INVENTOR.
ROBERT E. HINELINE
BY Nicholas T Volk
ATTORNEY.

Nov. 28, 1967  R. E. HINELINE  3,355,339
METHOD AND APPARATUS FOR MAKING SOLID TIRES
Filed Nov. 7, 1963  11 Sheets-Sheet 4

INVENTOR.
ROBERT E. HINELINE
BY
ATTORNEY.

Nov. 28, 1967  R. E. HINELINE  3,355,339
METHOD AND APPARATUS FOR MAKING SOLID TIRES
Filed Nov. 7, 1963  11 Sheets-Sheet 6

INVENTOR.
ROBERT E. HINELINE
BY
Nicholas T Volsk
ATTORNEY.

INVENTOR.
ROBERT E. HINELINE
BY
ATTORNEY.

Nov. 28, 1967  R. E. HINELINE  3,355,339
METHOD AND APPARATUS FOR MAKING SOLID TIRES
Filed Nov. 7, 1963  11 Sheets-Sheet 8

INVENTOR.
ROBERT E. HINELINE
BY Nicholas T. Volk
ATTORNEY.

INVENTOR.
ROBERT E. HINELINE

BY
ATTORNEY

United States Patent Office 3,355,339
Patented Nov. 28, 1967

3,355,339
METHOD AND APPARATUS FOR MAKING SOLID TIRES
Robert E. Hineline, Tustin, Calif., assignor to American Machine & Foundry Company, a corporation of New Jersey
Filed Nov. 7, 1963, Ser. No. 322,130
14 Claims. (Cl. 156—112)

This invention relates to a method and apparatus for applying elastomeric ribbon to metallic wheels for making solid, elastomeric tires on such wheels. The invention also relates to the end product produced in accordance with the disclosed method.

Solid rubber tires are used on road wheels, track support rollers, and idler wheels on half-tracked and full tracked vehicles. Use of the solid tires, or bands, on tracked vehicles, avoids the metal-to-metal contact which would otherwise occur between the wheels and the track. Solid tires on wheels are used in connection with materials-handling equipment such as forklift trucks, dollies, trailers and trucks.

Solid tires are applied to the wheels, according to the known methods, by extruding or calendering a slab of uncured elastomer of proper cross-section and then wrapping the necessary length of such slab around the periphery of the metallic wheel. An overlapping or a lapped splice is made at two ends of the slab, these two ends being properly skived for this purpose prior to wrapping the slab around the wheel. The above method is very laborious because of the thickness of the slab. Solid tires, as a rule, are so thick that is is difficult to bend and even more difficult to splice properly the two ends of such slab. Such splices have a tendency to spring back. To avoid these difficulties, it has been proposed also to wrap around the periphery of the wheels a plurality of superimposed turns of a thin locally calendered ribbon. Methods of this type are disclosed, for example, in the U.S. Patents 1,424,134 to P. W. Litchfield and 1,330,128 to E. S. Long. Such methods are time-consuming and, therefore, costly, since only one wheel at a time can be wound in this manner.

According to this invention, a plurality of wheels are stacked up on a tire building machine and then locally extruded ribbon is wound around the cylindrical surface formed by adjacent outer surfaces and peripheries of the wheels. The ribbon is wound along a path of a constant pitch spiral according to one method and a special "composite spiral" according to the second method with the transverse dimension of the ribbon being inclined at a sharp angle with respect to the outer cylindrical surface. The transverse dimension of the locally extruded ribbon is made sufficiently large so that the above angle of inclination is in the order of from 30° to 45°. This angle, in general, should be kept as small as possible for obtaining proper stitching of the ribbon to the cylindrical surface and also to the preceding turns.

It is, therefore, an object of this invention to provide a new method and machine for building solid tires on metallic wheels having cylindrical outer rims, i.e., the rims having a uniform, single diameter across the face of the rim.

It is an additional object of this invention to provide a new method and a machine of the above type in which a plurality of wheels are mounted on a rotatable tire-building machine and an elastomeric ribbon is then wound around the outer periphery of the drum formed by the wheels, the ribbon following either the path of a constant pitch spiral, according to one method, and a "composite spiral" according to the second method, with the succeeding turns partially overlapping the preceding turns in both methods and with transverse dimension of the ribbon being inclined to the face of the drum and forming a sharp angle with the drum also in both methods.

Referring to the drawings.

Figure 1:
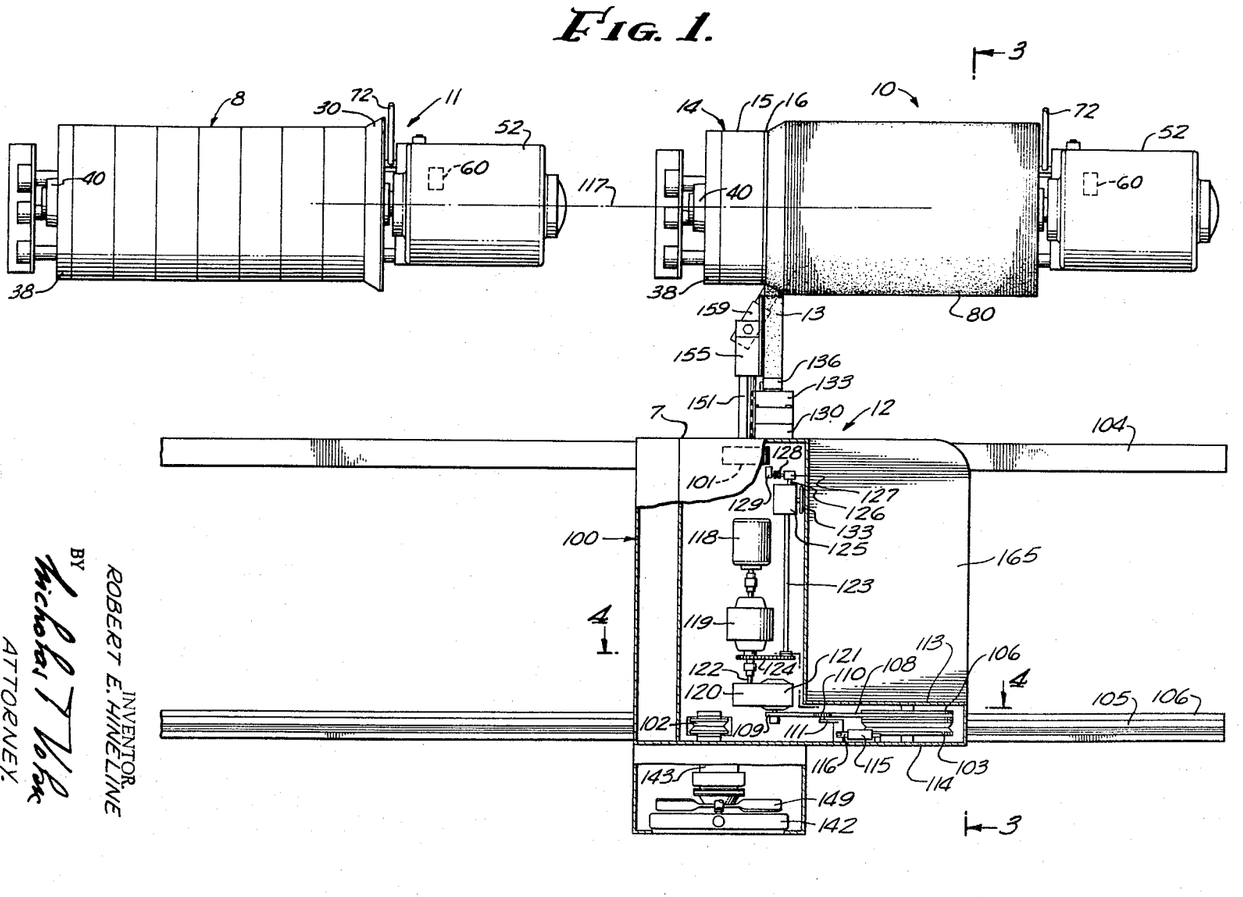
FIGURE 1 is a plan view of a tire-building machine and its server for winding an elastomeric ribbon on metallic wheels.
Figure 2:
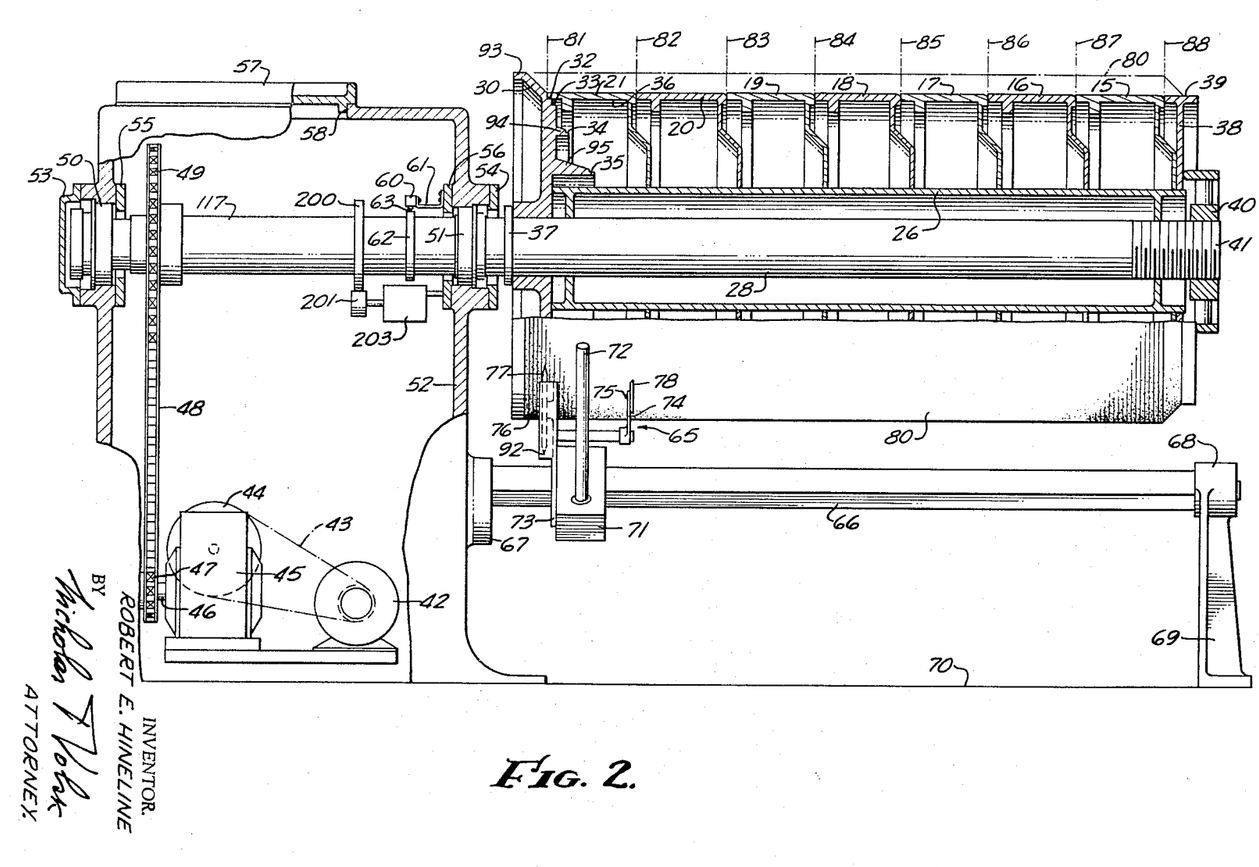
FIGURE 2 is an elevational side view of the tire-building machine.

Referring to the drawings, and particularly to FIG. 1, the machine includes three component machines: two identical tire-building machines 10 and 11 and one traveling extruder machine 12, which furnishes an extruded ribbon 13 first for machine 10 and then for machine 11, etc. The extruder machine extrudes an elastomeric ribbon 13 which is wound around a cylindrical drum 14 of the tire building machine 10 and a similar or identical drum 8 of machine 11. Drum 14 is obtained when a plurality of metallic wheels, 15 through 21, FIG. 2, are mounted on a sleeve 26 mounted on a shaft 28. The drum of machine 11 is obtained in the same manner and it may have the same or different external diameter depending upon the type of wheels, or the diameter of the wheels, mounted on the machine. Also mounted on shaft 28 is a starting collar 30 which has a plurality of notched seats 32, 33, 34 and 35, for accommodating various wheels having different diameter rims, i.e., various external diameters. As clearly illustrated in FIGS. 2 and 7, the metallic wheels suitable for original treading when new, or retreading when old, are of the type which have smooth, cylindrical single diameter rims 36, which are flat or straight across the entire width of the rim so that a ribbon can be wound across such cylindrical rim and a single diameter cylinder, or drum, is formed by a plurality of such rims when they are stacked up on sleeve 26 and shaft 28. The starting collar 30 abuts against a ring 37 keyed to shaft 28 and the seven wheels 15–21 are held in tight engagement with the starting collar 30 by means of an end collar 38 having a rim 39 of the same external or outer diameter as the external diameter of rim 36 of the wheels. Therefore, if different diameter wheels are to be treaded, the tire building machine should have as many end collars 38 of different diameter as the number of different diameter wheels to be retreaded on the machine. The end collar 38 is held in tight clamping engagement with the last, or outer, wheel 15 by means of an end nut 40 which makes a threaded engagement with the threaded end 41 of shaft 28. In this manner all seven wheels become tightly clamped together and to shaft 28 and rotate as a single unit with shaft 28 whenever shaft 28 is rotated.

Figure 8:
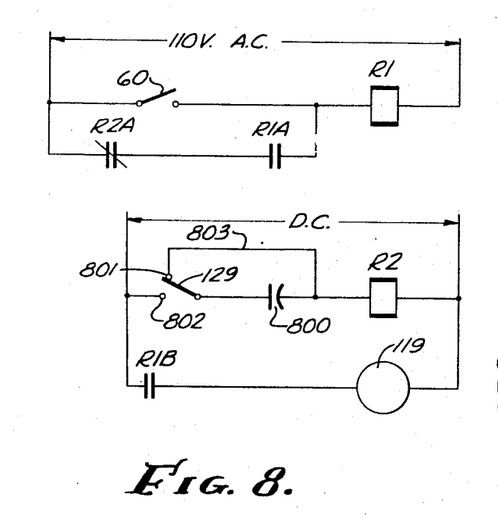
FIGURE 8 is the schematic diagram of electrical drive used for driving the extruder carriage.
Figure 9:
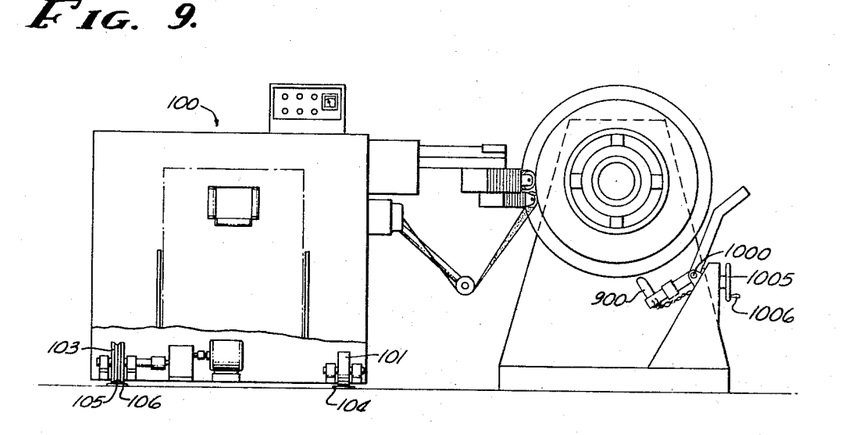
FIGURE 9 is an end view of the ribbon-winding machine and a second version of a knife used for cutting the elastomeric layer.
Figure 10:
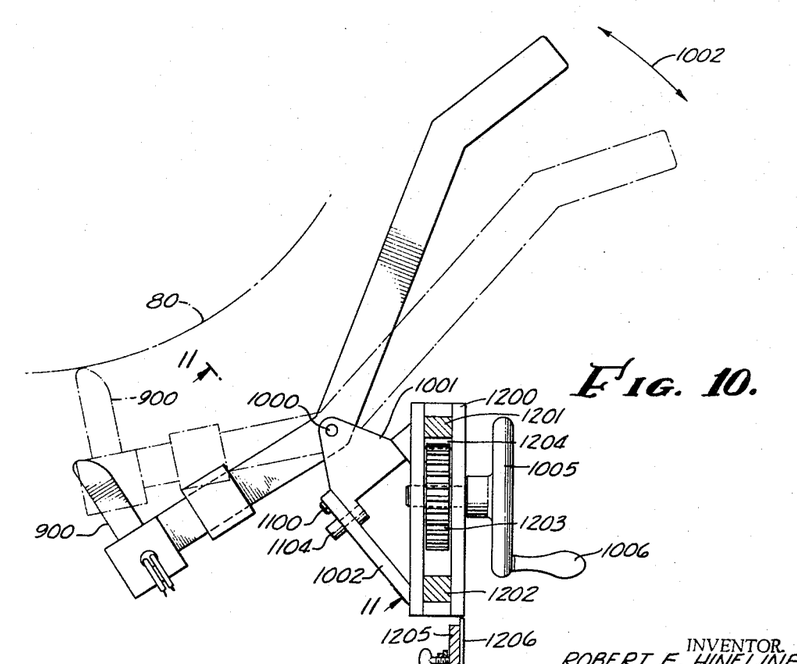
FIGURE 10 is an enlarged side view of the cutting knife shown in FIG. 9.

Shaft 28 is rotated by a direct current motor 42 connected by a timing belt 43 to a gear 44 which, in turn, is connected to a gear box 45, a counter shaft 46, a sprocket wheel 47, a sprocket chain 48 and a sprocket wheel 49 mounted on shaft 28. The D.C. motor 42 rotates shaft 28 at a controllable speed. The speed control circuit for motor 42 will be described later in connection with the description of FIG. 14. Shaft 28 is rotatively supported by two bearings 50 and 51 mounted in the main frame casting 52 having end plates 53, 54, 55 and 56, closing off the bearing housings, and a top cover 57 for closing a large opening 58 in the frame. A spin switch 60 is supported on the frame and cover 56 by means of a bracket 61. A collar 62, with a switch actuating finger 63, is mounted on shaft 28. Finger 63 actuates spin switch 60 once every revolution of shaft 28. As will be explained more in detail later in connection with the description of the "start-stop" control system illustrated in FIG. 8, the spin switch 60 is used for starting the transverse movement of the extruder machine 12 and a second transverse movement switch 129, actuated by a variable speed drive 125, FIG. 1, is used for stopping this transverse movement after a fraction of the spin revolution of shaft 28. As will be pointed out more in detail later in connection with the description of FIG. 15, the control system disclosed in FIG. 8 is a start-stop system, which means that while shaft 28 and all the seven wheels 15–21 are rotated continuously at a controllable speed by the D.C. motor 42, the transverse movement of the extruder machine 12 with respect to the tire building machine 10 (or machine 11) is a start-stop movement and takes place during a fraction of revolution of shaft 28, such as, say, 100°, 120° portion of the revolution of shaft 28. During the remaining 260° or 240°, the extruder machine 12 is at a standstill. Therefore, the extruder machine 12 has a start-stop movement, according to the first method of operating the extruder machine, which makes ribbon 13 follow the path of the so-called here "composite spiral" which will be described later in connection with the description of FIG. 15.

Figure 5:
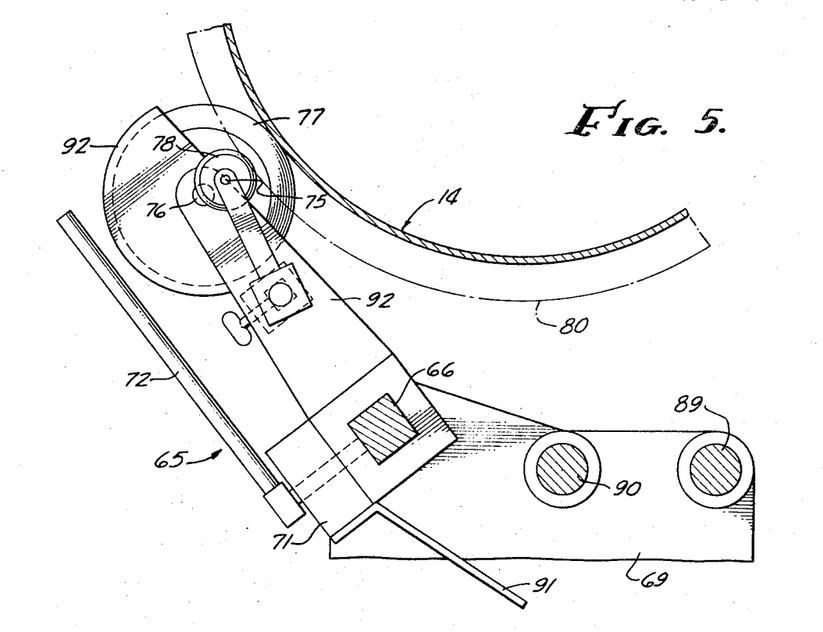
FIGURE 5 is a side view, partly in section, of a knife and knife frame.
Figure 6:
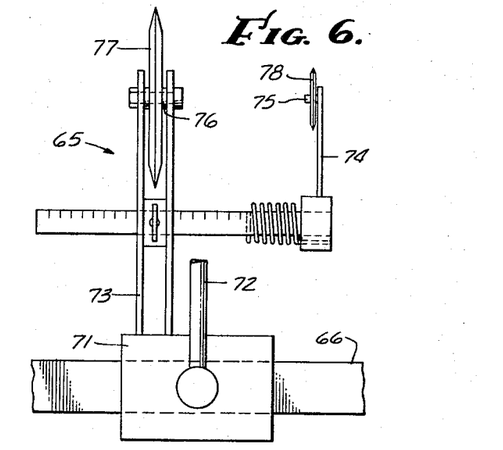
FIGURE 6 is a plan view of the knife illustrated in FIG. 5.

As illustrated in FIGS. 2, 5 and 6, the tire building machines 10 and 11 are also provided with a slidable and rotatable knife assembly 65. This assembly includes a rotatable rectangular knife rail 66 mounted in two rotatable bronze bushings (not visible) fitting into the respective hubs 67 and 68. Hub 67 is an integral part of the frame casing 52, while hub 68 is supported by an end bracket 69 which is bolted to a floor 70. A knife carriage 71 is slidably mounted on the knife rail 66. Carriage 71 is provided with a straight rod 72 which acts as a handle for operating a knife 77 and its carriage 71 and is used to swing the carriage and the knife toward and away from the composite drum formed by the wheels 15–21. Mounted on carriage 71 is a bracket 73 which supports an adjustable second L-shaped bracket 74 used for supporting a marking knife 78. The disc-shaped cutting knife 77 is mounted on an axle 76 and the marking knife 78 is mounted on an axle 75.

After an elastomeric layer 80 is deposited on the drum by winding ribbon 13 along the path of either a "composite spiral," according to method #1, or a continuous, conventional constant pitch spiral, according to method #2, knife 77 is used for making circular cuts in the vertical planes 81 through 88 which pass through the circular junctions formed between adjacent wheels and the junction between wheel 15 and starting collar 30. In this manner wheels 15 through 21 are separated from each other after they become joined together by the elastomeric layer 80 upon the completion of the ribbon winding process. A handle 72 is used for swinging knife 77 toward elastomeric layer 80, which is accomplished by rotating the knife rail 66 in its bushings and hubs 68 and 67. An appropriate marking is available on rail 66 for indicating the desired precise lateral position of carriage 71 on rail 66 for making the initial, or the first, cut in plane 81. Wheel 78, which is the marking wheel, and its L-shaped adjustable arm 74 are set, prior to making such cut, so as to mark the position of the next plane 82. Stated differently, the distance between the knives 77 and 78 is adjusted with the aid of bracket 74 so that it is equal to the distance between any two adjacent planes 81–82, or 82–83, etc., which is equal to the width of rims 15–21. In this manner knife 78 acts automatically as a marking knife, indicating the position of the next cut for knife 77.

Two additional round rods, or guide bars, 89 and 90 are provided to hold the end bracket 69 and the knife rail 66 in proper alignment with the main frame 52 and shaft 28. The knife carriage 71 is provided with a foot 91 which normally engages rod 90 in the manner illustrated in FIG. 3 so as to hold carriage 71 and knife 77 in the position away from the wheel drum and elastomeric layer 80. Knife 77 is partially surrounded by a safety shield 92.

The starting collar 30 is provided with starting circular inclined legs, or flanges, or shoulders 93, 94, 95, which are used for ribbon supporting surfaces during the initial winding of the ribbon, for starting the ribbon winding cycles. The angle of inclination $\beta$ of such flanges with respect to the horizontal line should be equal to the inclination of the ribbon on the drum, i.e., angle $\alpha$, FIG. 7. Angle $\alpha$ is the angle subtended by a line tangent to one surface of the ribbon and forming 90° angles with the two edges of the ribbon, which is line 715 in FIG. 7, and the horizontal line 716 intersecting line 715. Starting of the winding cycle is then accomplished by manually attaching the free end of the extruded ribbon 13 to the face of the ledge and then continuing the rotation of the drum and winding of the ribbon in the manner illustrated in FIGS. 1 and 7.

The second tire building machine 11 is identical to the first machine 10 and, therefore, it needs no additional description.

Two tire building machines are used to keep the extruder machine in continuous operation: when ribbon 13 is being wound on one machine, the second machine is "reloaded" to prepare it for winding of the ribbon immediately after the winding cycle is completed on the first machine.

The extruder machine includes a main frame 100 mounted on three wheels 101, 102 and 103. Wheel 101 is a flat-face wheel, with a smooth outer cylindrical surface which rides on a flat metallic band or rail 104, while the rims of the wheels 102 and 103 have V-shaped cross-sections and ride on a V-shaped rail 105 supported by a flat metallic strip 106. The entire extruder machine rides on the two rails 104 and 105 and the three wheels and is moved in one direction along the rails by means of an electric motor 118. Wheel 103 also includes a drive pulley 106 which has a flat, smooth cylindrical groove 107. A sprocket chain 108 is wrapped around groove 107 and a sprocket wheel 109 which drives or turns pulley 106 whenever the sprocket chain 108 is tightened by means of a sprocket wheel 110 rotatively mounted at one end of the lever arm 111 mounted on, and keyed to, a shaft 112. Shaft 112 is rotatively supported by two wall members 113 and 114 of the frame 100. A pneumatic actuator 115, having a push rod 116, engages the sprocket end of the lever arm 111 and pushes sprocket wheel 110 against the sprocket chain 108 to tighten the engagement of the chain with the sprocket wheel 109 and especially the smooth face 107 of pulley 106. When the chain is tightened in this manner by the actuator 115, sprocket wheel 109 frictionally engages pulley 106 and drives pulley 106 and wheel 103 with the result that the entire carriage 100 of the extruder machine is driven along the two rails 105 and 104.

Since the described version of the extruder machine is the start-stop machine, smooth-faced pulley 106 acts as a clutch between motor 118 and wheel 103. When chain 108 is tightened by actuator 115, the "clutch" becomes connected to wheel 103 and chain 108 slides over pulley 106 and its smooth groove 107 when actuator 115 is de-energized. This "clutch" connection is used for manually moving the machine on rails 104 and 105, or returning it to its original position, and also for manually moving it from one tire building machine 10 to the second machine 11. This "clutch" otherwise remains energized continuously when the machine is in operation.

The second version of the machine, in which motor 118 is a variable speed D.C. motor, and the extruder machine is moved or rolled along the rails 104 and 105 continuously at a constantly controlled speed, will be described later in connection with the description of FIG. 18.

The rails 104 and 105 are mounted on a floor and are parallel to the longitudinal axis 117 of the two tire-building machines 10 and 11. Since the two machines 10 and 11 are aligned with each other, they have a common longitudinal axis 117.

In the first version of the machine, the carriage 100 is driven by means of an induction motor 118 connected to an electrically operated clutch 119. A double reduction worm 120–121 is used between clutch 119 and sprocket wheel 109 to obtain proper speed reduction.

Figure 15:
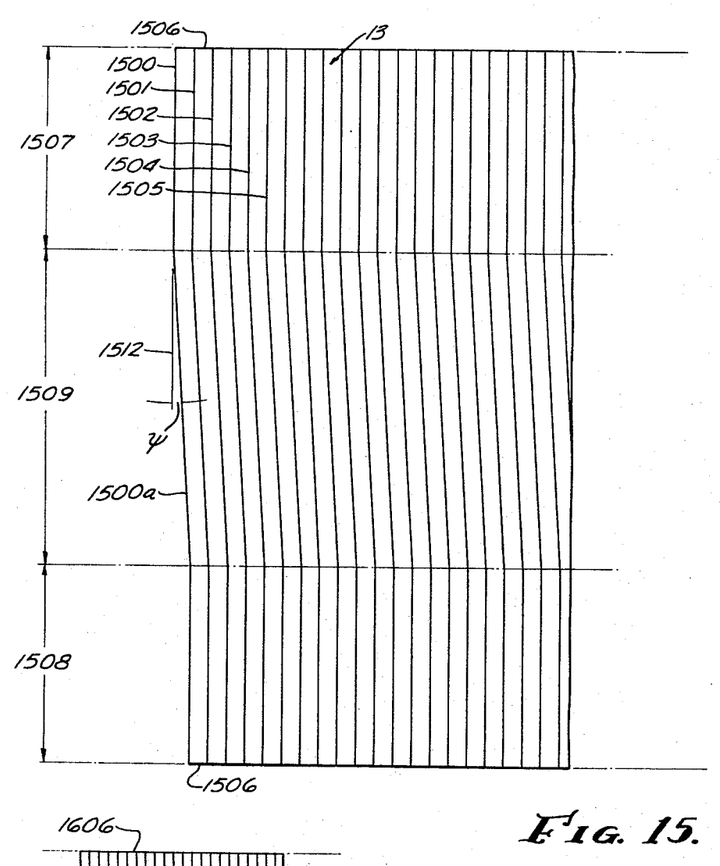
FIGURE 15 is a plan view of a portion of the winding and of the path followed by the ribbon when the control system and the method of winding is the so-called "start-stop" method.

A shaft 122 is used also to drive a shaft 123 with the aid of a timing belt 124. Shaft 123 is connected to a variable speed drive 125, such as a "Zero-Max" reducer manufactured by Zero-Max Co., which is provided with an outgoing stub shaft 126. The variable speed drive 125 is capable of rotating shaft 126 anywhere between 80 r.p.m. and 0 r.p.m., depending on the manual setting of a lever arm 133 used for operating the variable speed drive 125. Mounted on shaft 126 is a cam 127 having a finger 128 which momentarily closes a switch 129 during every revolution of shaft 126. Switch 129 is used for disconnecting electric clutch 119 after the desired number of revolutions of motor 118 and shaft 122, which, in turn, determines the amount of axial travel of the extruder carriage 100 on rails 104 and 105 for each revolution of shaft 28 and of the wheels mounted on shaft 28. This amount of axial travel of the extruder machine 12 during each 360° revolution of shaft 28 determines the thickness of the elastomeric layer wound around the cylindrical drum formed by the wheels 15–21. It also determines the degree of overlap between succeeding and corresponding preceding turns of ribbon 13 and the angle of inclination $\alpha$ of ribbon 13 with respect to the surface of the drum, and the "pitch" of the "composite spiral" wound on the drum. Normally, the terms "spiral" and "pitch" refer to a locus produced by continuous, uniform or non-uniform movement of a tool, in this case, ribbon 13, with respect to the drum of machine 10 or 11. The spiral, therefore, mathematically, is a continuous function. Since, in this case, the extruder machine moves along the rails only periodically, i.e., the movement is the start-stop movement, the path followed by the ribbon is that illustrated in FIG. 15. The lines shown in FIG. 15 illustrate the loci defined by adjacent edges 1500–1505, etc. of ribbon 13 when the entire winding produced on the drum is cut along line 1506 and the winding is unwrapped so as to be represented in a plan view in FIG. 15. For this reason, line 1506 appears at the top as well as at the bottom of FIG. 15 since it is the same line of transverse cut. When there is no movement of the extruder machine 12, the edges 1500–1505 are perpendicular to line 1506. This corresponds to the lengths 1507 and 1508 of the ribbon. The paths followed by the ribbon when the extruder machine is moving are represented by the slanted lines having the length 1509. The shape formed by the lines in the 1509 region is exaggerated in FIG. 15 for improving the clarity of the drawing. The 1509 length, as mentioned previously, may be in the order of 100°–160°–200°, the longer this region is, the smaller is angle $\psi$ between line 1512 and line 1500-$a$, line 1512 being at 90° to line 1506 as long as line 1506 is parallel to the longitudinal axis 117. The path followed by ribbon 13 in FIG. 15 is, as it is called here, the "composite spiral" since it may be considered as being composed of two parts: the first part corresponds to the part 1507–1508 when the pitch is equal to zero (a private case of a classical spiral), and then the second part 1509 having a fixed pitch or a substantially fixed pitch as long as the rotation of shaft 28 and of the drum formed by the wheels is at a constant rate. The rate of rotation of shaft 28 is controlled by the rate of extrusion of ribbon 13 and as long as the extrusion rate is constant, which is generally the case. The rate of rotation of shaft 28 is constant and the pitch formed by the ribbon within the length 1509 and angle $\psi$ are also constant.

Figure 16:
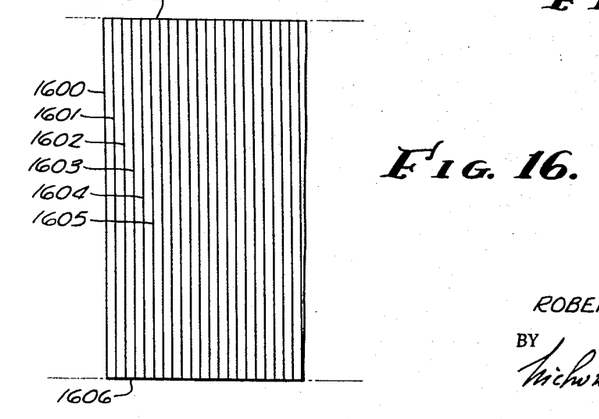
FIGURE 16 is a plan view of a portion of the winding and of the path followed by the ribbon when the ribbon is moved in the transverse direction at a continuous and constant rate as long as the extrusion of the ribbon is at a constant rate.

The classical spiral which is followed by ribbon 13 when the extruder machine is moving on rails 104 and 105 continuously at a controllable rate is illustrated in FIG. 16. Here all lines 1600–1605 corresponding to lines 1500–1505 in FIG. 15, are parallel to each other and ribbon 13 follows the path of a conventional constant pitch, constant diameter spiral.

Concluding the description of the extruder machine, an extruder 138 is driven by a motor 131 through a gear box 132. An adjustable die 133 is attached to the outer end of the extruder with the aid of a hinge and swing bolts 134 and 135. The extruded ribbon 13 supports an idler roller rotatively mounted on a roller arm 137 pivoted on a pivot 138 and having a counter-balancing weight 139 at the other end of the arm. Arm 137 is used for controlling the speed of the D.C. motor 42 by means of a potentiometer 140 included in the control circuit illustrated in FIG. 14, which will be described later. The extruder is provided with a self-contained water-cooling system to eliminate traveling hose connections which would be required otherwise. The extruder 138 has a water-cooled screw which is connected to the downstream outlet 141 of a water-cooling radiator 142 through a rotatable joint 143 and hoses 144 and 145. The outer shell of the extruder is also water-cooled and is connected to the outlet 141 with suitable hoses, not shown. An electric motor 148 drives a fan 149 and a water pump 146.

A stitcher arm 151 is supported by two bearings 153 and 154 which in turn are supported by frame members 152 of the extruder machine. Arm 151 terminates in a bracket 155 which supports idler rollers 156, 157 and 158 and a stitcher 159 which has a plurality of independently actuated stitching wheels 160 which stitch the ribbon to the drum in the manner illustrated in FIGS. 1, 3 and 7. The stitcher arm is actuated by a pneumatic actuator 161 which, after its actuation, exerts on the stitcher arm 151 and stitcher 160 a constant outward pressure through the actuator rod 162 connected to bracket 155 when it is energized. When it is de-energized, it withdraws the stitcher arm from the drum and slides it into the frame 152. A four-way solenoid operated valve V1 is used for operating actuator 161 at the beginning and the end of the winding cycle in the manner which will be described more in detail later in connection with the description of FIG. 3.

The elastomeric raw stock is furnished for use in extruder 138 in a form of a continuous ribbon 163 which is placed in a box 164 resting on a platform 165 provided for this purpose on frame 152 of the extruder machine. Ribbon 163 may be in the order of 2"–5" wide and ½"–¼" thick. It is calendered and cut directly at the calendering machines which receive the fully mixed and masticated stock directly from a Banbury mixer. In this manner the cost of the stock is reduced to an absolute minimum.

FIGURE 8 discloses a schematic diagram for operating the electric clutch 119 which connects and disconnects motor 118 from the drive mechanism used for driving the extruder carriage along its rails 104 and 105. Therefore, it is for the start-stop system, i.e., the system in which the extruder carriage is advanced a controllable amount during each spin revolution of drums 8 and 14 of the tire building machines 10 and 11 and then such advance is stopped, and started again after drum 8 reaches the next revolution around axis 117. The path followed by the ribbon with such operation of the extruder machine 12 is illustrated in FIG. 15 and has been described earlier. It is a zig-zag path which is called here, for a better name, a composite spiral, i.e., the spiral composed of a plurality of turns, each 360° turn including a zero pitch portion followed by the finite pitch having the desired magnitude.

As previously described, the spin switch 60 is actuated by finger 63 which is rotated by shaft 28 of the tire building machine. Momentary closing of the spin switch 60 energizes relay R1 and energization of this relay closes two normally open contacts of the relay, which are contacts R1A and R1B. Contacts R1A are connected in series with the normally closed contacts R2A of relay R2. Closing of contacts R1A establishes a holding, or locking, circuit for relay R1. Relay R1 remains energized until the normally closed contacts R2A become open, which takes place when relay R2 is de-energized. Closing of contacts R1B energizes the electric clutch 119, thus connecting motor 118 to the carriage of the extruder which then advances the carriage along the rails 104 and 105. Therefore, the extruder carriage 12 begins its travel after spin switch 60 becomes momentarily closed. This movement is then terminated after the second spin switch 129 becomes momentarily closed, thus de-energizing the electric clutch 119.

The circuit of relay R2 includes a capacitor 800 and the second spin switch 129. It may be remembered that this second spin switch 129 and its armature become momentarily transferred from contact 801 to contact 802 during one complete revolution of the "Zero-Max" drive 125. The "Zero-Max" drive 125 and its shaft 126 and cam 127, mounted on shaft 126, has a finger 128 which momentarily transfers the armature of spin switch 129 from contact 801 to contact 802. When the armature of spin switch 129 is on contact 801, capacitor 800 is shorted through the switch and a conductor 803. When the armature of spin switch 129 is transferred to contact 802, there is a momentary flow of current which charges capacitor 800 and at the same time momentarily energizes relay R2. Such energization of relay R2 opens contacts R2A which open the holding circuit of relay R1. Relay R1 becomes de-energized and opens contacts R1A and R1B. Opening of contacts R1B de-energizes clutch 119 thus stopping the advancement, or travel, of the extruder carriage along the rails 104 and 105. The amount of this travel is controlled by the variable speed drive 125 ("Zero-Max") which can be adjusted from 0 r.p.m. to 80 r.p.m. by the rotation of a wheel 133. The rotation, or setting, of wheel 133 thus determines: the thickness of the deposited layer 80, angle α, and the degree of overlap between the succeeding and preceding turns.

Figure 3:
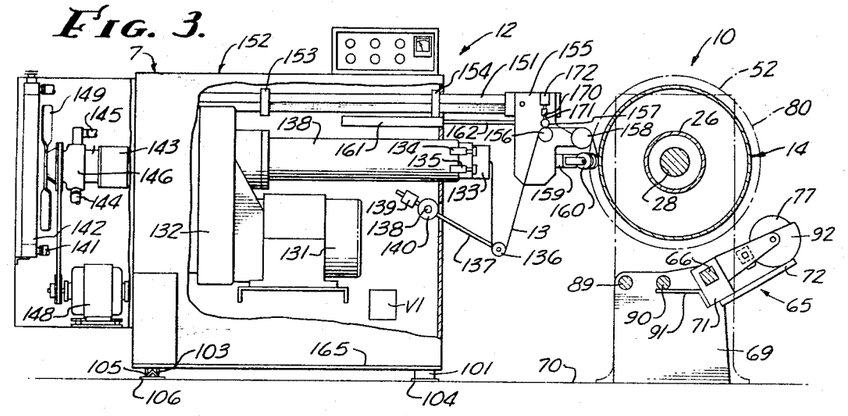
FIGURE 3 is an end view of the machine, the view being taken in the direction of arrows 3—3 illustrated in FIG. 1.
Figure 4:
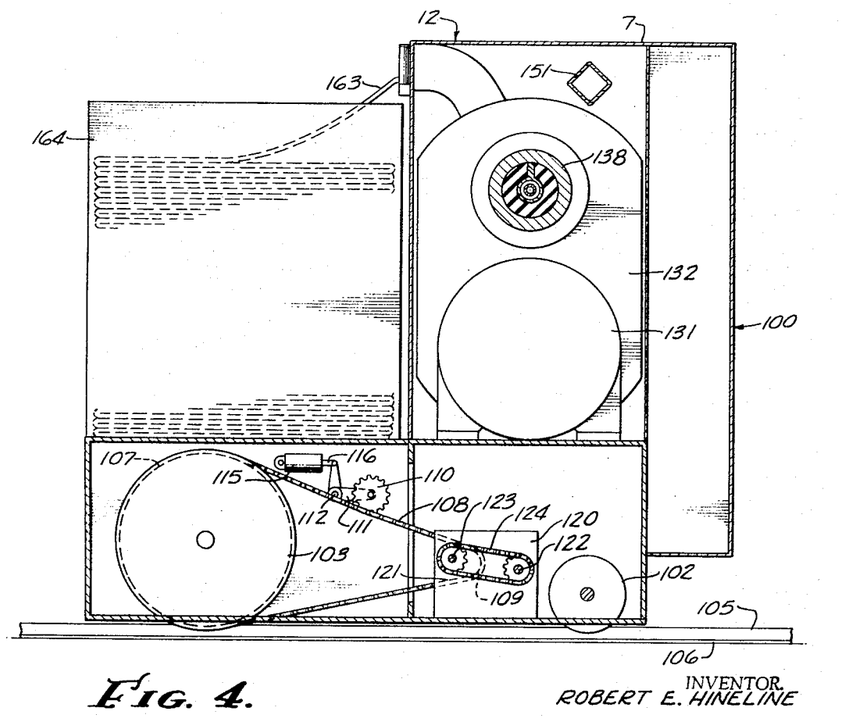
FIGURE 4 is a side view of the extruder portion of the machine taken in a plane 4—4 illustrated in FIG. 1.
Figure 14:
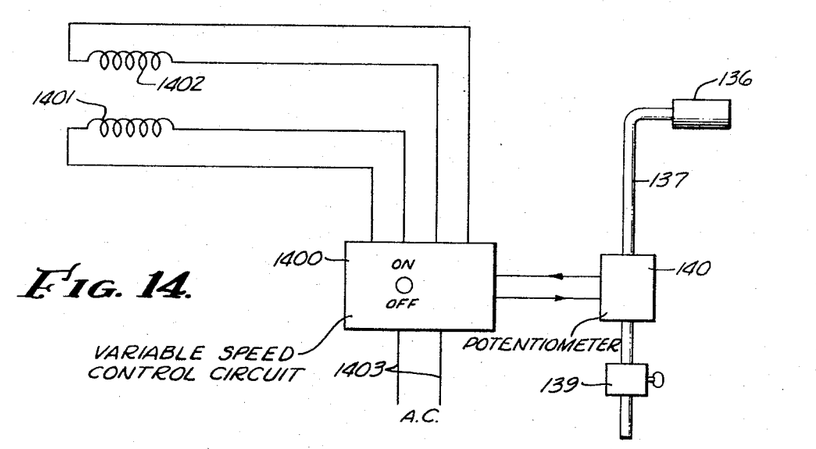
FIGURE 14 is a block diagram of the speed control circuit for a direct current motor used for driving the tire building machine.

FIGURE 14 discloses a block diagram of a speed control system for direct current motor 42 used for driving shaft 28. Extrusion of ribbon 13 by extruder 130 may not necessarily be at a constant rate. Minor variations in the rate of extrusion may take place because of the variation in line voltage used for driving induction motor 131, variation in the mastication of the raw elastomeric ribbon 163, variations in the temperature of raw stock and of the extruder itself, minor variations in the composition and physico-chemical nature of ingredients of the elastomer. All of the above factors may affect the rate of extrusion. Since ribbon 13 must be wound on drum 8 at the same rate as the rate of its extrusion by extruder 130, it becomes necessary to control the speed of motor 42 so that the peripheral speed of drum 8 at the point of application of ribbon 13 to the drum is exactly equal to the rate of extrusion. As mentioned in the introductory part of the specification, this control is accomplished with the aid of the idler roller 136 and the potentiometer arm 137 which operates a potentiometer 140. Potentiometer 140 is connected to a control circuit 1400 which is shown in FIG. 14 in a block form since circuits of this type are known. For a more detailed description, reference is made to the copending applications of Rudolph G. Holman, S.N. 196,542, Method and Apparatus for Applying Elastomeric Tread and Sidewalls on Pneumatic Tire Casing, filed May 1, 1962, now Patent No. 3,251,722, and Nicholas T. Volsk et al., S.N. 254,958, Variable Speed Ribbon Winding Machine, filed Jan. 30, 1963, now Patent No. 3,268,380, the above two applications, as well as this application, being assigned to the common assignee. Circuits of this type are also commercially available. For example, Reliance Electric and Engineering Company, Cleveland 17, Ohio, disclosed such circuit in its bulletin D2510, and is known as "Reliance V–S Drive." Essentially, circuits of this type function as follows: a source of alternating current from line 1403 is fully rectified in a control circuit 1400 by means of silicon-controlled rectifiers. The control electrodes of the two silicon controlled rectifiers comprising the rectifier bridge, are connected to a C–R timing circuit or a relaxation oscillator which impresses a control signal on the control electrodes of the two silicon-controlled rectifiers. Manual setting of the variable resistance R, depending upon the time constant of the C–R combination, can be made shorter or longer and in this manner either a greater or a smaller portion of the rectified wave passes through the rectifiers and in this manner the current flowing through the armature 1401 of motor 42 is made either smaller or larger, thus controlling the speed of the motor. The field winding 1402 of the direct current motor is connected directly across the output of the second rectifier which furnishes a constant field current to the field winding 1402. Therefore, the speed control is obtained by controlling the armature current.

Figure 7:
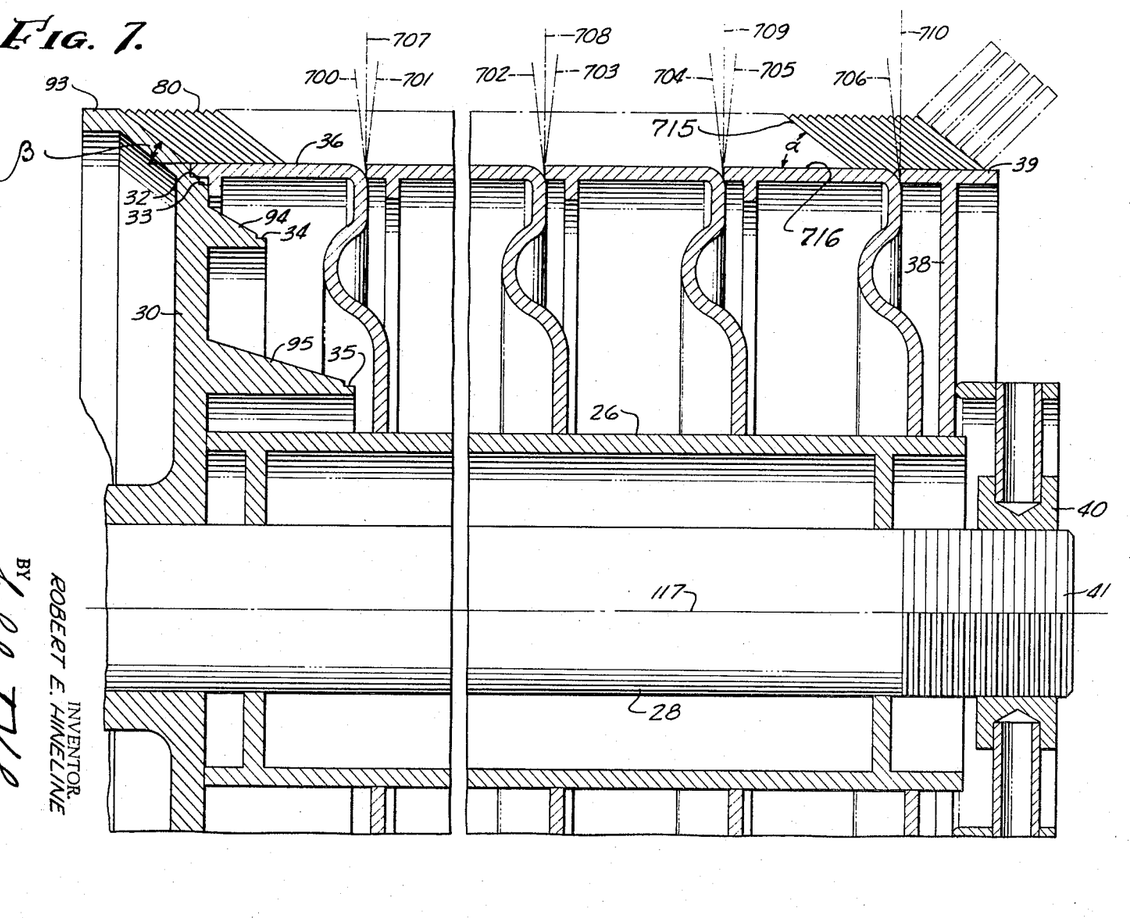
FIGURE 7 is a longitudinal section of the upper half of a mandrel and four support rollers, used in tracked vehicles, mounted on the mandrel and having an elastomeric ribbon wound around the support rollers in accordance with the disclosed method.

FIGURES 9, 10, 11, 12 and 13 illustrate another version of a cutting knife which may be used for making circumferential cuts illustrated by lines 700-706 in FIG. 7. In this case, these lines are inclined with respect to the planes 707-710 which are perpendicular to the central axis 117 of shaft 28. This method of cutting the elastomeric layer 80 may be used when it is desired to obtain slanting cuts of the type illustrated by lines 700-706 since the majority of the solid tires have a slightly smaller width at the face of the tires as compared to the width of the tire at the base. The same results could be achieved in the molds even when the cuts are perpendicular to the central axis 117 since the elastomers become sufficiently fluid so as to conform to the shape of the molds. Therefore, the cutting procedure described in connection with the description of FIGS. 5 and 6 is the preferred procedure.

Figures 11, 12, 13:
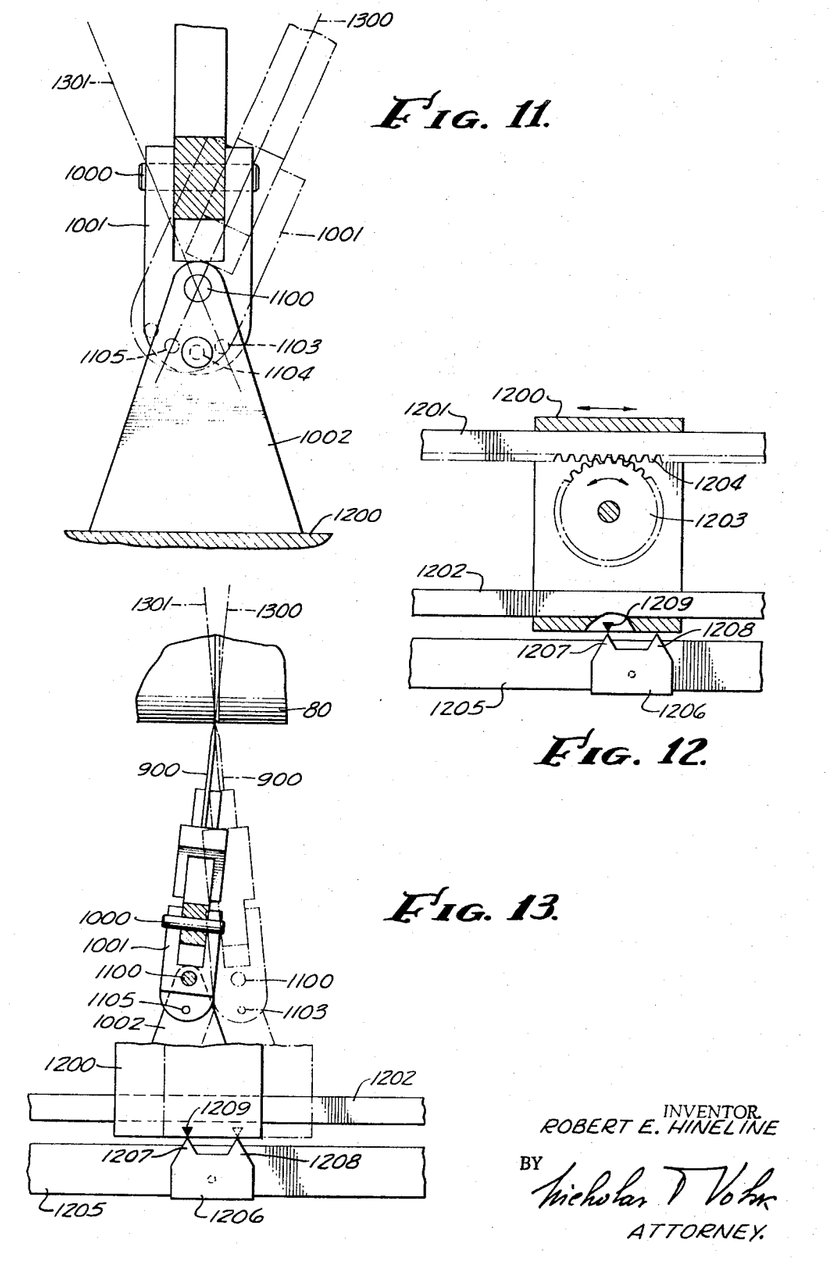
FIGURE 11 is an end view of the knife-supporting bracket also shown in FIGS. 8 and 9.
FIGURE 12 is a plan view, partly in section, of a mechanism used for shifting the carriage of the cutting knife.
FIGURE 13 is a plan view of the cutting knife and its carriage.

In order to swing knife 900 to different planes, the knife is so mounted that it can be rotated in two different planes at right angles to each other. The first rotation is around a pin 1000 illustrated in FIG. 10, which supports the knife on a bracket 1001. Pin 1000 permits the rotation of knife 900 in the direction of a double arrow 1002 so that the knife can be brought in contact with the elastomeric layer 80 in the manner illustrated in FIG. 10. The second rotation is that illustrated in FIG. 11 and it is around pin 1100 which is at right angles to pin 1000. Bracket 1001 is rotatable around pin 1100 which is mounted on a bracket 1102. Bracket 1102 is also provided with detents 1103, 1104, 1105 which are used for positioning knife 900 at the precise desired angles with respect to the elastomeric layer 80, in the manner indicated in FIGS. 11 and 13. The entire assembly of the knife is mounted on a carriage 1200, FIG. 12, which can be moved along rails, or guide bars, 1201 and 1202 by means of a rotatable pinion 1203 and a rack 1204 which is an integral part of the guide bar 1201. Pinion 1203 is rotated by means of a hand wheel 1005 provided with a handle 1006. In order to position the carriage of the knife in proper lateral position with respect to the elastomeric layer 80, a third bar 1205 is provided which has a plurality of slidable indicators 1206 slidably mounted on a graduated bar 1205. Each indicator 1206 is provided with two pointers 1207 and 1208 which are used for aligning a pointer 1209 provided on the knife carriage 1200 by rotating the hand wheel 1005. As indicated in FIG. 13, when pointer 1209 is in alignment with pointer 1207, knife 900 produces a cut in the plane 1300, provided that it is also positioned in proper manner with the aid of detent 1105 to the plane 1300 illustrated in FIG. 11. Pointer 1209 is then swung over to the alignment with pointer 1208 and knife 900 is then shifted into the second plane 1301 by means of detent 1103 and in this manner a cut in plane 1301 is obtained. These two cuts correspond to the cuts 700 and 701, 702 and 703, 704 and 705 illustrated in FIG. 7. In this manner elastomeric layer 80 is cut in a number of places so as to free wheels 15 through 21 from each other for subsequent taking off shaft 28 and sleeve 26.

The control system described thus far for controlling the joint operation of machines 10, 11 and 12 has been the so-called start-stop system which produces a composite spiral illustrated in FIG. 15. The extruder carriage 7, in the start-stop system, travels the desired distance during each complete spin revolution of drum 8 and then its movement is stopped and resumed again during the next spin revolution of drum 8. Therefore, the extruder carriage 7 first moves, then stops, and then moves again, etc. And it is for this reason that the first control system is called the start-stop system.

In the second system the extruder carriage 7 moves continuously at a controllable rate and this second method and its control system, therefore, will be called here a continuous travel system, the travel referring to the continuous but controllable travel of the extruder carriage 7.

The continuous travel system produces a classical helical spiral illustrated in FIG. 16 having a constant pitch as long as the thickness of the extruded ribbon 13 remains constant. The rate of travel of carriage 7 is controlled by the rate of ribbon extrusion and by the thickness of the extruded ribbon so as to deposit or wind the elastomeric layer 80 of the desired and constant thickness on drum 8, even though there may be variations in the thickness of the extruded ribbon 13 and the rate of extrusion.

Figure 17:
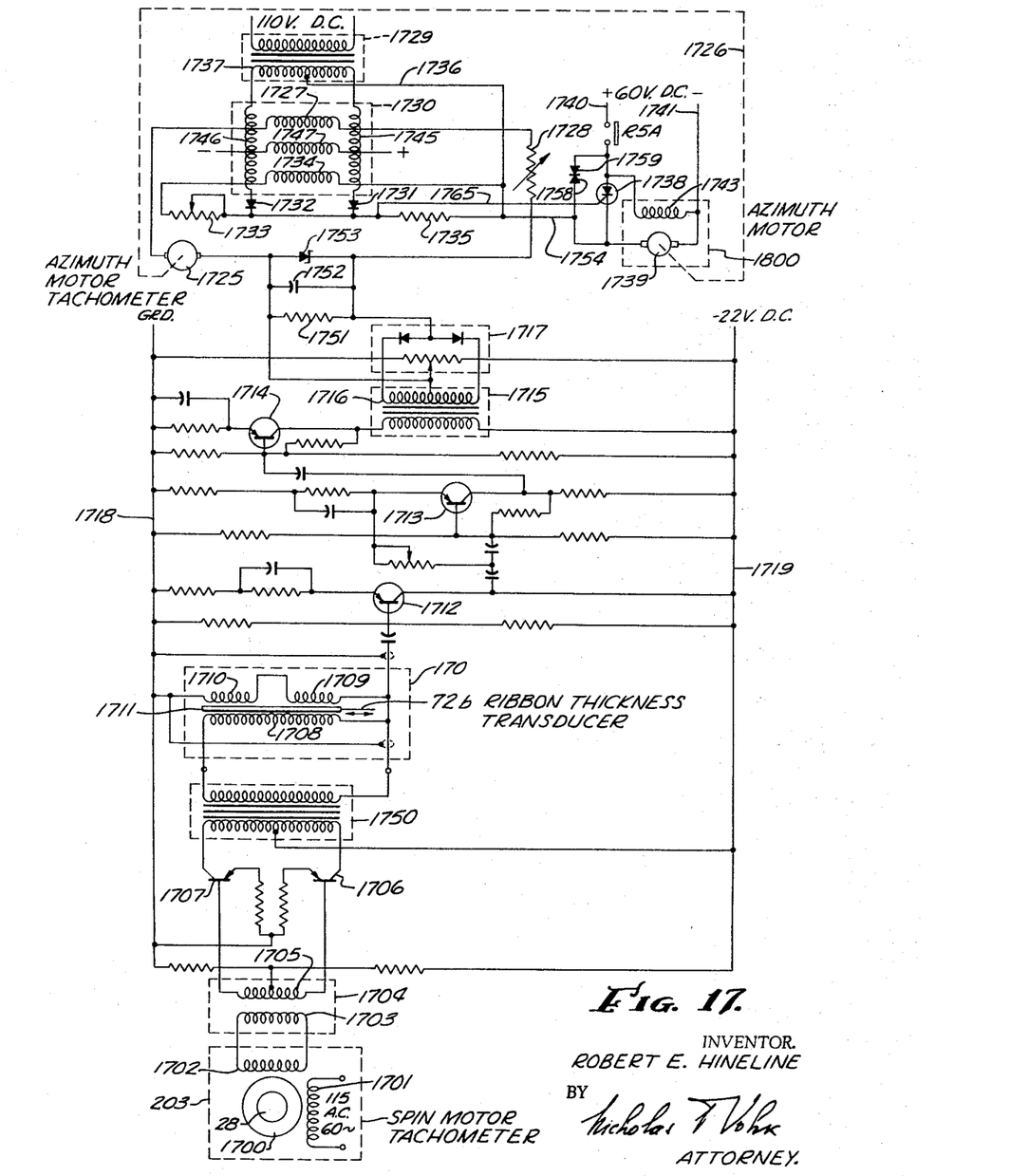
FIGURE 17 is the schematic diagram of the control system used for controlling the speed of the motor which moves the extruder carriage at the desired continuous, controllable speed.
Figures 18, 19:
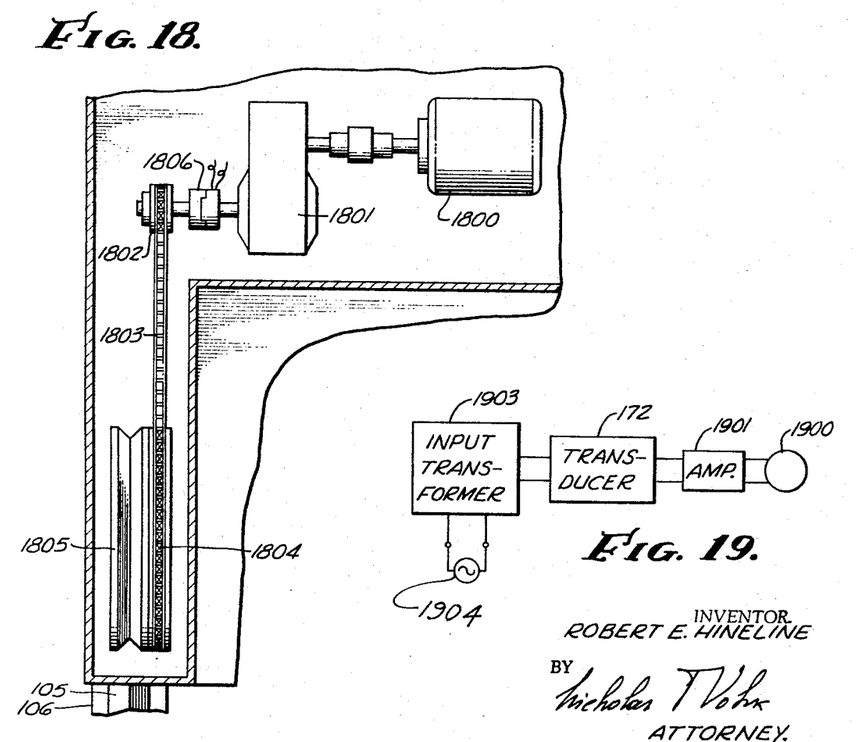
FIGURE 18 illustrates a second version of the control system in which the extruder carriage is moved at a continuous speed.
FIGURE 19 is a block diagram of the circuit continuously indicating the thickness of the extruded ribbon.

The continuous travel system is illustrated in FIG. 18 where a direct current motor 1800 is connected to a gear box 1801 for reducing the speed of rotation and the gear box 1801 is then connected to an electrical clutch 1806 for connecting to and disconnecting direct current motor 1800 from carriage 7. The electrical clutch 1806 is connected to a sprocket 1802 which drives a sprocket 1804 by means of a sprocket chain 1803. Sprocket 1802 is connected directly to the sprocket 1804 by the sprocket chain 1803. The sprocket wheel 1804 is directly connected to a carriage driving wheel 1805 having a rim with a V-shaped cross-section which rides on rail 105 in the same manner as wheel 103. The speed of the direct current motor 1800 which produces the continuous travel of carriage 7 is controlled by the control system, the schematic diagram of which is illustrated in FIG. 17.

Referring to FIG. 17, the control system for controlling the speed of rotation of the direct current motor 1800 includes the ribbon thickness compensating circuit, the speed of the spin compensating circuit (i.e., the speed of rotation of drum 8) and the instantaneous load feedback circuit of motor 1800, i.e., three circuits, all of which combine to generate a single resultant control signal which controls the magnitude of current flowing through the armature 1739 of the carriage motor 1800. The two speeds, the speed of rotation of drum 8, called here spin, and the speed of travel of the extruder carriage 7, must be correlated because the thickness of the deposited layer depends on the magnitude of these two speeds. The speed control system for the carriage motor 1800, therefore, first of all, makes the carriage speed bear a fixed ratio with respect to the variable spin speed and the thickness of the extruded ribbon. Thus, there are two speed compensating circuits, one for the speed of the spin of drum 8 and the second for the thickness of the ribbon. The third compensating circuit makes the magnitude of the current supplied to armature 1739 correspond to the load connected to the carriage motor. This load is the load imposed on the motor by the carriage when it is made to travel along rails 104 and 105. Generally this load is quite constant and, therefore, the load compensating circuit is provided primarily to produce a large starting current when the carriage motor 1800 becomes initially connected to the source of its power.

In order to control the speed of the carriage motor 1800 so that it constantly corresponds to the spin speed of drum 8, and, through this spin speed, to the rate of the ribbon extrusion, the spin shaft 28 is connected to a rotor 1700 of the two-phase tachometer 203 which is similar to a two-phase induction motor with a rotor 1700 and two stator windings 1701 and 1702, winding 1701 being the excitation winding connected to a source such as 115 volts, 60 cycles of alternating current. A voltage having a frequency of 60 cycles and proportional to the speed of rotation of rotor 1700 is generated in the output winding 1702. The output voltage appearing across winding 1702 is proportional to the input voltage and is used to control the speed of rotation of the carriage motor 1800 after it is combined with a plurality, i.e., additional two voltages, also used for simultaneously controlling the speed of motor 1800.

For this purpose, the tachometer output voltage is impressed on the primary 1703 of a step-up input transformer 1704. The center-tapped secondary 1705 of transformer 1704 is connected to a transistor push-pull amplifier 1706 and 1707 which impresses its output by means of an output transformer 1750 on transducer 170. From the description of FIG. 3, it is already known that transducer 170 constantly monitors, or measures, the thickness of ribbon 13. Transducer 170 includes a primary 1708, two opposing secondaries 1709 and 1710 and a magnetic plunger core 1711 actuated by the pivoted arm 171 which is connected to the idler roller 157, FIG. 3. Arm 171 supports the upper roller 157 which rides on top of ribbon 13 and, therefore, the position of plunger 171 depends on the thickness of ribbon 13. Transducer 170, therefore, combines two intelligence signals: the first signal corresponds to the speed of the spin of drum 8 around shaft 28 and, in this manner, the speed of extrusion of ribbon 13 and the second signal corresponds to the thickness of the ribbon. The product of these two signals is impressed on three transistor voltage amplifiers 1712, 1713 and 1714 connected to busses 1718 and 1719. Transistor amplifier 1714 impresses its output on a step-up, output transformer 1715 with a center-tapped secondary 1716. The secondary of transformer 1715 is connected to a full wave rectifier 1717 which impresses its output on an impedance adjusting resistor 1728. Resistor 1728 is also connected in series with the carriage motor tachometer 1725 which is driven through a shaft 1726 by the carriage motor 1800. The circuit of the carriage motor tachometer 1725 includes resistors 1751 and 1728 and a signal winding 1727 of a magnetic amplifier 1730. The magnetic amplifier 1703 includes the following windings: the signal winding 1727, the biasing winding 1747, a gain control winding 1734, and two excitation windings 1746 and 1745. Resistor 1728 is used to adjust the impedance of the carriage motor tachometer circuit, and in this manner, in combination with the signal winding 1727, it adjusts the opposing voltage which is impressed by tachometer 1725 on the signal winding 1727 and the resultant error voltage produced in this circuit. The final control signal impressed on the silicon-controlled rectifier 1738 is the difference between the signal impressed on the magnetic amplifier 1730 by transformer 1715 minus the signal voltage impressed by tachometer 1725. In this manner, the silicon-controlled rectifier 1738 is also responsive to the error voltage. The magnetic amplifier biasing winding 1747 is connected to a source of direct current, and the two excitation windings 1745 and 1746 are connected to a source of alternating current through a transformer 1729 with its secondary 1737 connected to the excitation windings and the primary connected to a source of alternating current. The excitation windings 1746 and 1745 are connected in series with diodes 1732 and 1731 and an output resistor 1735. The voltage appearing across the output resistor 1735 is used to control the conductivity of the silicon-controlled rectifier 1738 which, in turn, controls the current flowing through the armature 1739 of the carriage motor 1800. The output resistor 1735 is also connected in series with the secondary signal winding 1734 of the magnetic amplifier, which is coupled to the signal winding 1727 through the magnetic amplifier and, therefore, the voltage appearing across resistor 1735 also includes the control signal from the magnetic amplifier. The output resistor 1735 is connected across a silicon-controlled rectifier 1738 over conductors 1765 and 1754. Silicon-controlled rectifier 1738 is also connected in series with the armature 1739 of the carriage motor 1800, a source of direct current connected to conductors 1740 and 1741 and contacts R5A of the carriage motor relay R5, not shown, which connects the carriage motor after the first 360° spin revolution and disconnects the carriage motor 1800 after the last 360° spin revolution of the ribbon winding cycle. The carriage motor 1800 remains connected to the D.C. source throughout the entire winding cycle. A field winding 1743 of the carriage motor 1800 is connected across the conductors 1740 and 1741 and in series with contacts R5A of the azimuth motor relay R5. A surge suppressor, or transient shorting circuit, including diodes 1758 and 1759, is also connected across rectifier 1738.

A filtering circuit 1751–1752 and a voltage limiting zener diode 1753 are connected across the rectified output of transformer 1715.

FIGURE 19 is a block diagram for the ribbon thickness meter 1900, which is a calibrated voltmeter connected to an amplifier 1901. Meter 1900 continuously and directly indicates the thickness of the extruded ribbon 13. Amplifier 1901 is connected to the second transducer 172 which, in turn, is connected to an A.C. source 1904 through a transformer 1903. Meter 1900 continuously measures the thickness of the ribbon by means of two rollers 156 and 157, roller 157 actuating arm 171 which in turn actuates two transducers 170 and 172. The ribbon thickness transducer 170 is also illustrated in FIG. 17 at 1708, 1709, 1710 and 1711.

Figure 20:
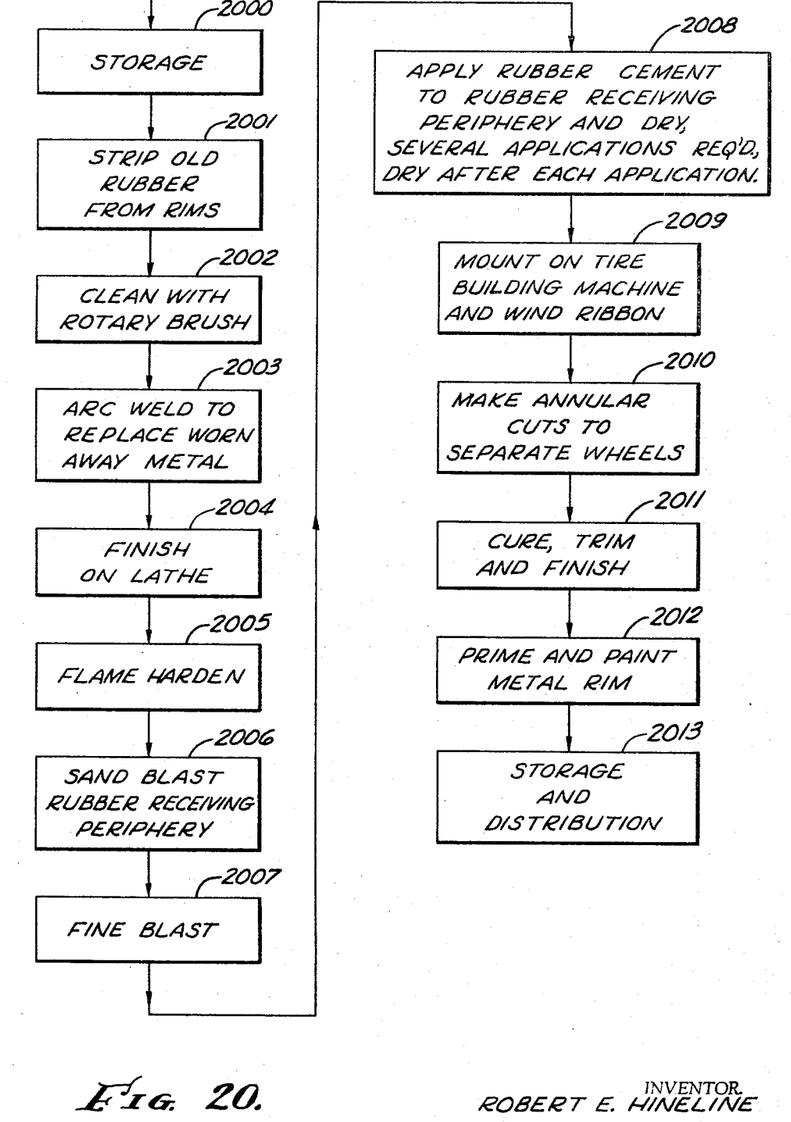
FIGURE 20 is a flow diagram indicating the order of the manufacturing steps used in the course of building solid elastomeric tires on used metallic wheels.

FIGURE 20 is a flow diagram illustrating the steps which may be required in retreading used solid tire wheels and also the steps for treading new wheels. The steps are self-explanatory and only a brief description is necessary. When retreading old wheels, they are taken out of storage (2000), stripped of old rubber by using a lathe (2001), then cleaned with a rotary brush (2002) and if any of the metal portions of the wheel, such as flanges or rims, are worn away, the missing metal is restored by depositing the needed amount of metal on the worn surfaces by arc welding additional metal onto these surfaces (2003). The wheel is then finished on a lathe (2004), flame-hardened (2005) and its rim is then sand blasted first with a coarse sand blast (2006) and then with a fine sand blast (2007). The rim is then coated with a rubber cement, dried, recoated and dried several times again (2008), then mounted on the tire building machine 10 or 11, FIG. 1, and ribbon 13 is wound around the drum 8 formed by mounting on shaft 28 a plurality of wheels of equal diameter (2009). After an elastomeric layer 80 has been wound on the drum, a plurality of circular cuts is made in the manner illustrated in FIGS. 5, 10 and 11 (2010); the elastomeric layer is then cured and in this manner bonded to the rim (2011); the metal parts are then primed and painted (2012) and then the finished wheels are sent by a conveyor to storage or distribution (2013). The steps for applying an elastomer to the new wheels are identical to those outlined in FIG. 20, except that steps 2000–2005 may be omitted since they do not apply to the new wheels.

What I claim is:

1. The method of building solid tires on circular, cylindrical rims of wheels having equal outside diameters, said method including the steps of stacking a plurality of said wheels on a common shaft with said rims forming a cylindrical drum having a common rotational axis with said shaft, producing an elastomeric ribbon having a width greater than the maximum thickness of the desired solid tire, winding said ribbon along the outer surface of said drum with the inner face of said ribbon forming a sharp angle, in a radial plane passing through said axis, with said surface and the outer face of said ribbon forming an obtuse angle with said surface in the same plane, and with adjacent turns overlapping each other, said ribbon thereby producing a continuous elastomeric layer on the outer surface of said drum, and thereafter circumferentially cutting through said layer in line with the circular contact junctions of adjacent rims to form individual solid tires.

2. The method as defined in claim 1 in which the path followed by said ribbon is a continuous helical spiral, the pitch of said spiral being related to and varying with the thickness of ribbon to be applied.

3. The method as defined in claim 1 in which the path of said ribbon is a composite spiral having a first zero pitch portion and a second portion having a pitch greater than zero, said first and second portions comprising 360°, or a complete turn of said ribbon around said drum.

4. The method as defined in claim 1 which also includes the step of stitching said ribbon to said drum and to corresponding adjacent preceding turns, producing a transverse displacement between said ribbon and said drum prior to the stitching of said ribbon, and controlling the rate of said transverse displacement as a function of the thickness of said ribbon and as a function of the rate of local extrusion of said ribbon.

5. The method of depositing a constant thickness elastomeric layer along an outer cylindrical periphery of a drum formed by a plurality of equal diameter rims of wheels mounted side-by-side on a common shaft, said method including the steps of locally extruding an elastomeric ribbon having a width greater than the thickness of said layer, providing a starting flange adjacent to the first, and the innermost rim, applying the free end of said ribbon to a point on said starting flange, thereafter spinning said drum and said shaft around their common axis, and simultaneously producing a transverse displacement of the point of application of said ribbon to said drum at a controllable rate, controlling said rate as a function of the rate of extrusion of said ribbon and as a function of the thickness of said ribbon to produce said constant thickness elastomeric layer on said drum by winding said ribbon at said controllable rate, and thereafter making circular cuts in said elastomeric layer along the circular junctions of adjacent rims for separating said layer into individual portions deposited on the respective rims.

6. An apparatus for depositing an elastomeric layer on wheel rims having equal diameters, for equipping said wheels with solid tires, said apparatus including a stationary tire building machine, said machine comprising a shaft for mounting a plurality of said wheels side-by-side on said shaft, said wheels, upon being mounted on said shaft, having their rims forming a continuous cylindrical drum, and first means for rotating said shaft and said wheels; said apparatus also including a traveling extruder machine having a carriage, an extruder mounted on said carriage, and second means for moving said carriage along a path parallel to the common longitudinal axis of said shaft and said drum.

7. The apparatus as defined in claim 6 in which said tire building machine also includes a frame at one end of said shaft, said frame rotatively supporting said one end of said shaft, the remaining length of said shaft projecting beyond and freely suspended from said frame and having its opposite end free to mount said plurality of wheels on said shaft by sliding said wheels along the free length of said shaft, and a disc having a plurality of starting collars keyed to that portion of said shaft which is adjacent to said frame.

8. The apparatus as defined in claim 6 which also includes tachometer means actuated by said first means for rotating the shaft and control means controlling said second means for moving the carriage so as to move said carriage at a rate controllable, at least in part, by said tachometer means.

9. The apparatus as defined in claim 6 in which said second means for moving the carriage includes a motor, a drive means connected to and driven by said motor and coupled to said carriage for moving said carriage upon energization of said motor, a first switch means actuated by said shaft once every revolution of said shaft, relay means controlled by said switch, said first switch means and said relay means actuating said motor for starting the movement of said carriage along said path, and second switch means actuated by said second means for deactuating said relay means and said motor upon a predetermined amount of travel of said carriage along said path.

10. The apparatus as defined in claim 6 which includes first relay means for actuating said second means for moving the carriage during each revolution of said shaft and at a predetermined angular position of said shaft, and second relay means for de-actuating said second means after a predetermined controllable amount of travel of said carriage along said path, said second means for moving the carriage further including a direct current motor having a field winding and an armature and an electronic control circuit for controlling the current flowing through said armature as a function of the rate of extrusion of said ribbon by said extruder.

11. The apparatus as defined in claim 6 which also includes a cutting knife, means for supporting said knife, said means including a rail parallel to the longitudinal axis of said drum for sliding said knife along the length of said rail for making said circumferential cuts in said elastomeric layer for separating adjacent wheels and rims from each other with the aid of said circular cuts.

12. The apparatus as defined in claim 11 which also includes additional means for properly positioning said knife in the planes perpendicular to the longitudinal axis of said shaft and passing through the circular junctions between adjacent rims of said wheels.

13. An apparatus for depositing an elastomeric layer of a cylindrical drum, said apparatus comprising first means for rotating said drum, an extruder for extruding an elastomeric ribbon, a stitcher for applying said ribbon to said drum while said drum is being rotated by said first means, first control means for making the rate of rotation of said drum by said first means correspond to the rate of extrusion of said ribbon, second means for moving said extruder at a controllable rate along a path parallel to the longitudinal axis of said drum for transversely displacing the point of application of said ribbon on said drum in the course of the rotation of said drum and winding of said ribbon on said drum whereby adjacent turns of said ribbon overlap each other, second control means for controlling said means, said second control means being actuated by said first means so as to make the rate of said movement proportional to the rate of extrusion of said ribbon by said extruder, and third control means generating an electrical signal, the magnitude of which is continuously proportional to the thickness of said ribbon, said third control means also controlling said second means so as to make the thickness of the elastomeric layer deposited on said drum independent of the variation in the thickness of the extruded ribbon.

14. A method of depositing a solid, constant thickness elastomeric layer on a cylindrical surface of a wheel rim mounted next to a lateral support means for said layer, said lateral support means extending outwardly beyond said rim, said method including the steps of providing an elastomeric ribbon having a substantially rectangular cross-section, making the thickness of said ribbon several times smaller than its width, whereby said ribbon has first and second wide faces and first and second narrow edges, attaching the free end of said ribbon with its first face to said lateral support and its first edge to an adjacent portion of said cylindrical surface, thereafter rotating said wheel rim around its normal rotational axis at a rate corresponding to the rate of supplying said ribbon, guiding said ribbon to said wheel and said support so as to wind said ribbon edgewise around said rim with only the first edge of said ribbon engaging said rim and the first face of said ribbon engaging said support, said winding starting beyond a first plane tangent to the first edge of said rim, continuing such winding until said layer has the desired width, stitching said ribbon with its first edge to said rim and the first face—through the length of the first turn—to said support, and thereafter stitching the first face to the second face in all subsequent turns, whereby said constant thickness elastomeric layer comprises a continuous spiral of said ribbon with the second edge of said ribbon forming the outer surface of said layer and the first edge of said ribbon being bonded to said rim, said winding being continued beyond a second plane tangent to the second edge of said rim, cutting off all the elastomeric material projecting beyond said first and second planes tangent to the rim edges and curing the remaining elastomeric material and bonding it to the rim of said wheel to form a solid tire on said rim.

References Cited

UNITED STATES PATENTS

| Re. 25,349 | 3/1963 | Hanson | 156—130 |
| 3,177,918 | 4/1965 | Holman | 156—130 X |
| 3,251,722 | 5/1966 | Holman | 156—130 |
| 3,264,162 | 8/1966 | Holman | 156—130 X |
| 3,308,000 | 3/1967 | Holman | 156—130 X |

EARL M. BERGERT, *Primary Examiner.*

HAROLD ANSHER, *Assistant Examiner.*